US006954215B2

(12) United States Patent
Noyle

(10) Patent No.: US 6,954,215 B2
(45) Date of Patent: Oct. 11, 2005

(54) SYSTEM AND METHOD FOR EMPLOYING NON-ALPHA CHANNEL IMAGE DATA IN AN ALPHA-CHANNEL-AWARE ENVIRONMENT

(75) Inventor: Jeffrey M. J. Noyle, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 10/185,076

(22) Filed: Jun. 28, 2002

(65) Prior Publication Data

US 2004/0001071 A1 Jan. 1, 2004

(51) Int. Cl.[7] .................................................. G09G 5/02
(52) U.S. Cl. ...................... 345/592; 345/589; 345/600; 345/605; 382/276; 382/283
(58) Field of Search ................................ 345/501, 549, 345/588, 589, 592, 600, 605, 422; 382/276, 283

(56) References Cited

U.S. PATENT DOCUMENTS 5,914,725 A * 6/1999 MacInnis et al. ........... 345/441
5,982,381 A * 11/1999 Joshi et al. .................. 345/629
6,128,001 A * 10/2000 Gonsalves et al. .......... 345/589
6,400,832 B1 * 6/2002 Sevigny ...................... 382/103

OTHER PUBLICATIONS

Mulder, J.D. et al., "Pixel Masks for Screen–Door Transparency", *IEEE Visualization, Proceedings of the Conference on Visualization*, 1998, 351–358.

Porter, T. et al., "Compositing Digital Images", *International Conference on Computer Graphics and Interactive Techniques, Proceedings of the 11th Annual Conference on Computer Graphics and Interactive*, 1984, 253–259.

* cited by examiner

Primary Examiner—Matthew C. Bella
Assistant Examiner—Mackly Monestime
(74) Attorney, Agent, or Firm—Woodcock Washburn LLP

(57) ABSTRACT

An image rendered by a non-alpha-channel-aware application is employed in an alpha-channel-aware environment. The pixel data file to be written to by the non-alpha-channel-aware application is initialized by setting the alpha value for each pixel to 1. The alpha-channel-aware application then writes to the initialized pixel data file, changing some or all pixel data. The alpha value for each pixel is then decremented by 1 (modulo 256) making the changed pixels opaque and the unchanged pixels transparent.

19 Claims, 5 Drawing Sheets

FIG. 2

A 4x4 grid where each cell contains "(255, 255, 255, 1) 200". Label 199 points to one of the cells.

| (0, 255, 255, 0) 305 | (255, 255, 255, 1) 310 | (255, 255, 255, 1) 310 | (0, 255, 255, 0) 305 |
|---|---|---|---|
| (255, 255, 255, 0) 305 | (255, 255, 255, 1) 310 | (255, 255, 255, 1) 310 | (0, 0, 0, 0) 305 |
| (0, 255, 100, 0) 305 | (0, 255, 100, 0) 305 | (0, 255, 255, 0) 305 | (0, 0, 0, 0) 305 |
| (0, 0, 0, 0) 305 | (0, 0, 0, 0) 305 | (0, 0, 0, 0) 305 | (0, 0, 0, 0) 305 |

| (0, 255, 255, 255) 405 | (255, 255, 255, 0) 410 | (255, 255, 255, 0) 410 | (255, 255, 255, 0) 410 |
|---|---|---|---|
| (255, 255, 255, 255) 405 | (255, 255, 255, 0) 410 | (255, 255, 255, 0) 410 | (255, 255, 255, 0) 410 |
| (0, 255, 100, 255) 405 | (0, 255, 100, 255) 405 | (0, 255, 255, 255) 405 | (0, 255, 255, 255) 405 |
| (0, 0, 0, 255) 405 | (0, 0, 0, 255) 405 | (0, 0, 0, 255) 405 | (0, 0, 0, 255) 405 |

FIG. 4

SYSTEM AND METHOD FOR EMPLOYING NON-ALPHA CHANNEL IMAGE DATA IN AN ALPHA-CHANNEL-AWARE ENVIRONMENT

FIELD OF THE INVENTION

This invention relates to the field of computer graphics, and in particular to a system and method for utilizing non-alpha-channel-aware images in an alpha-channel-aware environment.

BACKGROUND

To display an image on a computer display, pixel data must be produced which contains information regarding how each pixel of the display must act to produce the image. An application typically renders the image to be displayed to a provided pixel grid. The size of the grid is based on the size of the image to be rendered. The pixel grid corresponds to a pixel data file that stores the information needed to display the image on the computer display. The information includes a pixel data value for each pixel contained within the image. When the image is to be displayed, the pixel grid in the pixel data file is mapped onto an actual area of a display, and, along with pixel data values from other images collocated on the same area of the display, the pixel data values are used to determine how pixels on the display should function.

Typically, a pixel data value for a pixel is contained in four bytes. The first three bytes specify the red, green, and blue values for the pixel. In older graphics environments, the fourth byte is ignored. This fourth byte was included only because most processor designs can deal more effectively with memory in four-byte increments than in three-byte increments, and so, for storing pixel display information, the cost in storage was made up for by the processing efficiency.

When an application renders an image to be displayed to an existing pixel data file, the application which renders the image overwrites some or all of the data in the pixel data file. The resulting file is then used, alone or in combination, to describe the functioning of pixels on a display to display the image.

Alpha-Blending

As described above, the fourth byte of a pixel data value is not used in older graphics environments. In newer graphics environments, however, the fourth byte is used to store an alpha value (also called an alpha channel), which is used in a technique known as alpha blending.

Alpha blending is a method for simulating transparency when a display is made up of overlapping layers of images. In alpha blending, the alpha value of each pixel specifies an opacity level for that pixel. In particular, an alpha value of 0 indicates that the pixel is fully transparent, and an alpha value of 255 indicates that the pixel is fully opaque (non-transparent). An intermediate alpha value (one between 0 and 255) indicates an intermediate level of opacity. The alpha value of a pixel of an image in the foreground determines to what extent any information from any collocated pixels in background images will be displayed.

For an example of a use of alpha-blending, consider a computer display with an icon displayed on top of a background pattern. To create such a display using alpha blending, a pixel data file is used which stores information about how the icon should be drawn. Within this pixel data file for the icon, for some pixels, the stored alpha value is greater than 0. These pixels are opaque, and it is these opaque pixels that make up the image of the icon. All the other pixels in the stored grid of pixel data have an alpha value of zero. These pixels are transparent and are not part of the image of the icon. When the pixel data from the pixel data file corresponding to the icon is displayed on top of a background pattern image corresponding to the background pattern, the icon is displayed, and the background pattern image shows through in any areas where the pixel data file for the icon indicated that the pixels are transparent. Additionally, if any pixels in the icon image have a value of less than 255 (full opacity) some information from the background image pattern may be viewed through the icon image.

Generally, when alpha blending is used, pixels in a foreground image that have a non-zero alpha value are displayed either in combination with those in a background image, or, in the case of total opacity of the foreground image, in place of those in a background image. The background image shows though unobscured where any pixels in the icon image have an alpha value of zero. In this way, a graphics environment that implements alpha blending (an alpha-channel-aware environment) can use the alpha channel values to display combinations of images that overlap.

Non-Alpha-Channel-Aware Applications

Alpha blending and the use of the alpha value are not known by many older applications (non-alpha-channel-aware applications) that create pixel data files. In the usual case, a non-alpha-channel-aware application takes as input a pixel data file to be written to, and, in that pixel data file, overwrites the pixel data value for any number of pixels. In this way, a new image is written into the pixel data file. Any image information which had previously existed in the input image data file is overwritten in each pixel that has been written to by the non-alpha-channel-aware application. The output of the non-alpha-channel-aware application is the partially or totally rewritten pixel data file.

Importantly, when new pixel information is written in to the pixel data file, many non-alpha-channel-aware applications set the last byte of the pixel data value to zero for each pixel that is overwritten. This byte is the byte used as the alpha value in alpha-channel-aware-applications.

Using A Non-Alpha-Channel-Aware Application in an Alpha-Channel-Aware Environment When a non-alpha-channel-aware application generates a pixel data file for use with an alpha-channel-aware environment, an issue arises in that the alpha value for each pixel in the image drawn by the non-alpha-channel-aware application is set to zero. Pixel data not created by the non-alpha-channel-aware application is not changed by the non-alpha-channel-aware application, so the original alpha value of such pixel data (which may be greater than zero) is retained. These pixels may appear if the pixel data file is used in an alpha-channel-aware environment. But because pixel data created by the non-alpha-channel-aware application has an alpha value of zero, every pixel for which a pixel data value was written to the pixel data file by the non-alpha-channel-aware application is transparent. These pixels will not appear when the pixel data file is used in an alpha-channel-aware environment.

Therefore, in order to use the output of non-alpha-channel-aware application in an alpha-channel-aware context, some method must be used to modify the alpha values of the pixel data. Changing the opacity of all the pixels to a non-zero value, regardless of whether they have been written to by the non-alpha-channel-aware application, would result in some opacity of all pixels in the image, even those that were not written by the non-alpha-channel-aware application and are not part of the intended image.

Recognizing such a condition, and in the prior art, a mechanism was established whereby when initializing the pixel data file to be allotted to the application, the pixel data value for every pixel is set to a sentinel value or color. Then, after the application has written the image to the pixel data file, the pixel data value for every pixel is examined. If a particular pixel data value still has the sentinel value or color, the alpha value for that pixel is set to zero. If the particular pixel data value does not contain the sentinel value, the alpha value for that pixel is set to a desired opacity.

Significantly, such mechanism has two drawbacks. First, the mechanism is computationally expensive in that every pixel must be read and compared to the sentinel value, and possibly re-written. Secondly, if the non-alpha-channel-aware application happens to write a pixel to a value that matches the sentinel value, such written pixel is erroneously rendered transparent.

Accordingly, a need exists for a method and mechanism for allowing a non-alpha-channel-aware application to render an image for an alpha-channel-aware environment. More particularly, a need exists for such a method and mechanism that is computationally inexpensive and does not cause erroneously transparent pixels.

SUMMARY OF THE INVENTION

In accordance with the present invention, a system and method is provided which allows a non-alpha-channel-aware application to write pixel data to a pixel data file. Each pixel changed by the non-alpha-channel-aware application is set to a prespecified level of opacity while each pixel not changed by the non-alpha-channel-aware application is rendered transparent, with reduced processing time and possibility of error over the prior art method.

In accordance with one embodiment of the invention, each pixel in the pixel data file is initialized to have an alpha value of 1. After the non-alpha-channel-aware process has completed writing to the pixel data file, one pass is made over the image, decrementing the alpha value of each pixel by 1. This pass results in the pixels written by the non-alpha-channel-aware process, which had been set by that process to an alpha value of zero having a new alpha value of 255 (since subtraction in a byte is performed modulo 256 (because there are eight bits in a byte, and $2^8=256$). Each pixel not written to by the non-alpha-channel-aware application is rendered transparent because of its alpha value of zero, the result of each such pixel's alpha value being initialized to 1 and then decremented by 1.

In accordance with another embodiment of the invention, where the opacity desired is that represented by alpha value of p, the alpha value is represented in n bits, with an alpha value of $2^n-1$ being the most opaque and an alpha value of 0 being the least opaque, and where the non-alpha-channel-aware application sets the alpha value of each pixel data value that it writes to m, each pixel in the pixel data file is initialized to have an alpha value of $2^n-p+m$. After the non-alpha-channel-aware process has completed writing to the pixel data file, one pass is made over the image, decrementing the alpha value of each pixel by m−p (modulo $2^n$). This pass results in the pixels written by the non-alpha-channel-aware process having an alpha value of p, and those not written by the non-alpha-channel-aware process having an alpha value of 0.

Other aspects of the present invention are described below.

BRIEF DESCRIPTION OF THE DRAWINGS

The foregoing summary, as well as the following detailed description of presently preferred embodiments, is better understood when read in conjunction with the appended drawings. For the purpose of illustrating the invention, there are shown in the drawings exemplary constructions of the invention; however, the invention is not limited to the specific methods and instrumentalities disclosed. In the drawings:

FIG. 2 is a block diagram of a pre-initialized group of pixels in a pixel data file before a non-alpha-channel-aware process has written to the pixel data file.

FIG. 3 is a block diagram of a group of pixels in a pixel data file after a non-alpha-channel-aware process has written to the pixel data file but before the transformation of alpha values according to the inventive method.

FIG. 4 is a block diagram of a group of pixels in a pixel data file after transformation of alpha values according to the inventive method.

DETAILED DESCRIPTION OF PREFERRED EMBODIMENTS

Overview

In the present invention, when a non-alpha-channel-aware application renders an image to be employed in an alpha-channel-aware environment, the alpha value of each pixel written to the pixel data file by the application is set to make the pixel opaque, and each pixel not written to the pixel data file by the application is set to make the pixel transparent.

Exemplary Computing Environment

Figure 1:
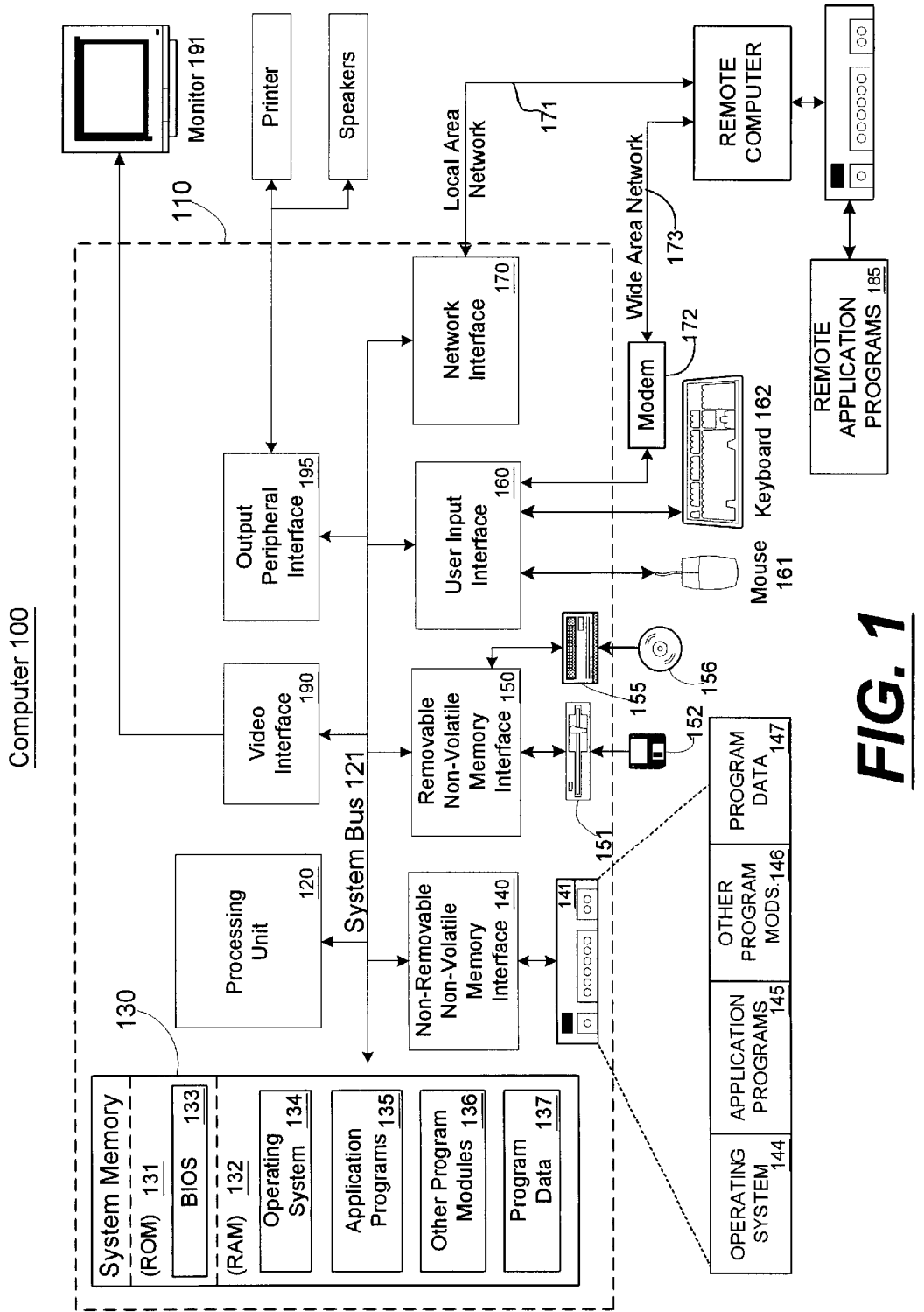
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer system 100. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Transforming the Output of a Non-Alpha-Channel-Aware Application

According to one embodiment of the invention, a method allows the use of output from a non-alpha-channel-aware application in an alpha-channel-aware context. In order do so, there must be a way to change to a desired level of opacity the alpha value of each pixel in the pixel data file that the non-alpha-channel-aware application had changed to zero and set the alpha value of each pixel in the pixel data file that had not been changed by the non-alpha-channel-aware application to zero.

In FIGS. 2, 3 and 4, each pixel is represented as a small square with four numbers in parentheses, corresponding to the four bytes of information (pixel data value) stored in pixel data file 199 for the pixel. The last byte is the alpha value.

According to an embodiment of the invention, and as shown, a pixel data file 199 is used for storing the image to be produced. No data from the pixel data file 199 beyond that which will be written to it by the non-alpha-channel-aware application will be displayed in the final image, therefore the pixel data file used should not be one in which any data of significance is being stored.

As seen in FIG. 2, the alpha value (the last byte) of each pixel 200 of the pixel data file 199 is initialized to a value of 1. The values for the first three bytes (red, green, blue values) of each pixel 200 are irrelevant for the purposes of the present invention; as an example, the byte values are equal to 255 for each of the pixels 200. The initialization is done before the pixel data file 199 has been acted on by the non-alpha-channel-aware application, as shown in first step 510 of the flowchart of FIG. 5.

Figure 5:
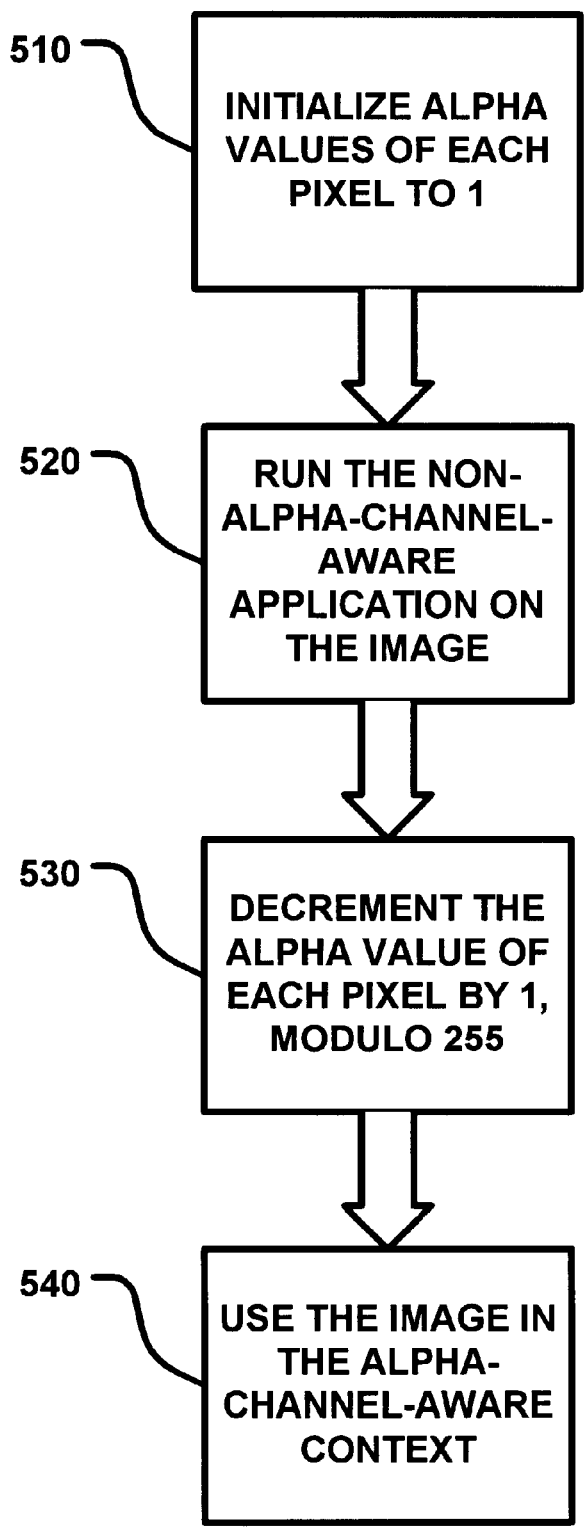
FIG. 5 is a flow chart of the inventive method.

After being initialized, as shown in the second step 520 of FIG. 5, the pixel data file 199 of FIG. 2 is then used by the non-alpha-channel-aware application, which writes an image into pixel data file 199 by changing the pixel data values for some or all pixels 200. The resulting pixel data file 199 is shown in FIG. 3.

As shown in FIG. 3, after the pixel data file 199 has been acted upon by the non-alpha-channel-aware application, changed pixels 305, have been written to by the non-alpha-channel-aware application. Others of the pixels, unchanged pixels 310, have not been written to by the alpha channel application and contain the same values that they had before the non-alpha-channel-aware application was run.

The alpha value for each of the changed pixels 305 has been set to 0 and the values of the other bytes have also been changed in many cases. Note, however, that for one of the changed pixels 305, the pixel data value is (255, 255, 255, 0). While the red, green, and blue values remain at 255, the alpha value is 0 for that pixel as well, indicating that that pixel has been written to by the non-alpha-channel-aware application, even though that could not be seen by examining the first three bytes of the pixel data.

As shown in the third step 530 of FIG. 5, each alpha value in all pixels (both changed pixels 305 and unchanged pixels 310) is decremented by 1. The resulting pixel data file is shown in FIG. 4. This decrement, when performed on a byte, is performed modulo 256. Therefore, for each pixel 405 for which the alpha value had been zero (changed pixels 305 from FIG. 3), the new alpha value becomes 255 and the pixel is rendered opaque when the pixel data file 199 is used in an alpha-channel-aware application. Each pixel 410 for which the alpha value thereof had been 1 (unchanged pixels 310 from FIG. 3) has its alpha value become 0, and is rendered transparent when the pixel data file 199 is used in an alpha-channel-aware application. In this way, with only one arithmetic operation performed on each pixel and no comparisons performed, the pixels 305 which had been changed by the non-alpha-channel-aware application are opaque, while the unchanged pixels 310 are transparent. The pixel data file 199 with the image may then be used in an alpha-channel-aware environment, as shown in fourth step 540 of FIG. 5.

Other embodiments of the invention are possible. In some graphics systems, the pixel data is contained in two bytes rather than four bytes. In these systems, 5 bits are used for each of red, green, and blue values, and the last bit is the alpha bit (0 for transparent; 1 for opaque). In this case, the bit containing the alpha value should be set to 1 before the non-alpha-channel-aware-application is run and the alpha bit should be changed (from 1 to 0; from 0 to 1) after the application has run. This may be done by incrementing, decrementing, or any other logical operator means that performs this change with the desired efficiency.

Any other system of storage of pixel information in which opacity is indicated by an alpha value of $2^n-1$ (where the alpha value is n bits long, in other words) and transparency is indicated by an alpha value of 0 can utilize the method of this invention by setting the alpha value to 1 and performing subtraction of 1 modulo $2^n$.

It may be that a non-alpha-channel-aware application exists which sets the alpha value of changed pixels to a value m other than zero. Here, the method of this invention may be utilized by initializing the alpha channels to a value of m+1 before the application is run, and then decrementing the values in the alpha channels by m+1 modulo $2^n$ (where n is the number of bits in the alpha value).

It may also be that the image produced by the non-alpha-channel-aware application is meant to be only partially opaque. In such a case, and where the alpha value is n bits long, full opacity is represented by an alpha value of $2^n-1$, and the resultant image is desired to have opacity value of p, the method of this invention initializes each alpha value to a value of $2^n-p$, and p (modulo $2^n$) is added to each alpha value after the application has run. This method is used where the non-alpha-channel-aware application sets the value of the alpha channel to zero.

The cases can be combined—where the alpha channel is n bits long, the non-alpha-channel-aware application sets the value of the alpha channel to m, and the desired opacity is p, the alpha value of each pixel should be initialized to $2^n-p+m$, and then, after the non-alpha-channel-aware application is has run, p−m should be added (or m−p subtracted), modulo $2^n$.

This method can be implemented in a graphics system, an operating system, a computer readable medium having stored thereon a plurality of computer-executable instructions, a co-processing device, a computing device, or a modulated data signal carrying computer executable instructions for performing the method.

CONCLUSION

The programming necessary to effectuate the structures of the present invention and the processes performed in connection with the present invention is relatively straightforward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful mechanism that allows a non-alpha-channel-aware application to render an image for an alpha-channel-aware environment. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method for using an image in a pixel data file rendered by a non-alpha-channel-aware application in a alpha-channel-aware environment, where (i) the non-alpha-channel-aware application writes pixel data values to an existing pixel data file of pixel data values; (ii) each pixel data value includes an n-bit alpha value and corresponds to a pixel location; (iii) the non-alpha-channel-aware application sets the alpha value of the pixel data value to 0 for each pixel for which a pixel data value is written by the application to the pixel data file; and (iv) the alpha-channel-aware environment is a graphic environment in which each alpha values is used to set transparency of the corresponding pixel when the image in the pixel data file is displayed in the foreground of other image data, with an alpha value of zero corresponding to a full transparency and increasing alpha values corresponding to increasing levels of opacity, comprising:

(a) initializing the alpha value of the pixel data value for each pixel data value in the pixel data file to 1;
   (b) executing the non-alpha-channel-aware application on the pixel data file;
   (c) changing the alpha value of each pixel data value by changing the alpha value of the pixel data values in the pixel data file to 0 for each pixel data value in the pixel data file with an alpha value of 1, and changing the alpha value of the pixel data value in the pixel data file to the alpha value for full opacity for each pixel data value with an alpha value of 0; and
   (d) displaying the pixel data file in the alpha-channel-aware environment.

2. The method of claim 1, where said changing of the alpha value of the pixel data value comprises decrementing the alpha value of the pixel data value for each pixel data value in the pixel data file by 1, modulo $2^n$.

3. The method of claim 2, where n is selected from a group consisting of 1 and 8.

4. At least one of an operating system, a computer-readable medium having stored thereon a plurality of computer-executable instructions, a co-processing device, a computing device, and a modulated data signal carrying computer executable instructions for performing the method of claim 1.

5. A method for using an image in a pixel data file rendered by a non-alpha-channel-aware application in a alpha-channel-aware environment, where (i) the non-alpha-channel-aware application writes pixel data values to an existing pixel data file of pixel data values; (ii) each pixel data value includes an n-bit alpha value and corresponds to a pixel location; (iii) the non-alpha-channel-aware application sets the alpha value of the pixel data value to m for each pixel for which a pixel data value is written by the application to the pixel data file; and (iv) the alpha-channel-aware environment is a graphic environment in which each alpha value is used to set transparency of the corresponding pixel when the image in the pixel data file is displayed in the foreground of other image data, with an alpha value of zero corresponding to a full transparency and increasing alpha values corresponding to increasing levels of opacity, comprising:

(a) initializing the alpha value of the pixel data value for each pixel data value in the pixel data file to m+1;
   (b) executing the non-alpha-channel-aware application on the pixel data file; and
   (c) changing the alpha value of each pixel data value by changing the alpha value of the pixel data in the pixel data file to 0 for each pixel data value in the pixel data file with an alpha value of m and changing the alpha value of the pixel data value in the pixel data file to the alpha value for full opacity for each pixel data value with an alpha value of 0; and
   (d) displaying the pixel data file in the alpha-channel-aware environment.

6. The method of claim 5, where said changing of the alpha value of each pixel data value comprises decrementing the alpha value of the pixel data value for each pixel data value in the pixel data file by m+1 modulo $2^n$.

7. At least one of an operating system, a computer-readable medium having stored thereon a plurality of computer-executable instructions, a co-processing device, a computing device, and a modulated data signal carrying computer executable instructions for performing the method of claim 5.

8. A method for using a non-alpha-channel-aware application in a alpha-channel-aware environment, where (i) the non-alpha-channel-aware application writes pixel data values to an existing pixel data file of pixel data values; (ii) each pixel data value includes an n-bit alpha value and corresponds to a pixel location; (iii) the non-alpha-channel-aware application sets the alpha value of the pixel data value to m for each pixel for which a pixel data value is written by the application to the pixel data file; (iv) the alpha-channel-aware environment is a graphic environment in which each alpha value is used to set transparency of the corresponding pixel when the image in the pixel data file is displayed in the foreground of other image data, with an alpha value of zero corresponding to a full transparency and increasing alpha values corresponding to increasing levels of opacity; and (v) the alpha value for a desired opacity for pixels written by the non-alpha-channel-aware application is p, comprising:

(a) initializing the alpha value of the pixel data value for all pixel data value in the pixel data file to $2^n$−p+m;
   (b) executing the non-alpha-channel-aware application on the pixel data file;
   (c) changing the alpha value of each pixel data value by changing the alpha value of the pixel data value in the pixel data file to m for each pixel data value in the pixel data file with an alpha value of $2^n$−p+m and changing the alpha value of the pixel data value in the pixel data file to p for each pixel data value with an alpha value of m; and
   (d) displaying the pixel data file in the alpha-channel-aware environment.

9. The method of claim 8, where said changing of the alpha value of the pixel data value comprises incrementing the alpha value of the pixel data value for all pixel data value in the pixel data file by p−m, modulo $2^n$.

10. The method of claim 8, where said changing of the alpha value of the pixel data value comprises decrementing the alpha value of the pixel data value for all pixel data value in the pixel data file by m−p, modulo $2^n$.

11. The method of claim 8, where at least one of p or m is zero.

12. At least one of an operating system, a computer readable medium having stored thereon a plurality of computer-executable instructions, a co-processing device, a computing device, and a modulated data signal carrying computer executable instructions for performing the method of claim 8.

13. A computer graphics system comprising computer executable modules for using an image in a pixel data file rendered by a non-alpha-channel-aware application in a alpha-channel-aware environment, where (i) the non-alpha-channel-aware application writes pixel data values to an existing pixel data file of pixel data values; (ii) each pixel data value includes an n-bit alpha value and corresponds to a pixel location; (iii) the non-alpha-channel-aware application sets the alpha value of the pixel data value to 0 for each pixel for which a pixel data value is written by the application to the pixel data file; and (iv) the alpha-channel-aware environment is a graphic environment in which each alpha values is used to set transparency of the corresponding pixel when the image in the pixel data file is displayed in the foreground of other image data, with an alpha value of zero corresponding to a full transparency and increasing alpha values corresponding to increasing levels of opacity, said computer modules comprising:

(a) means for initializing the alpha value of the pixel data value for each pixel data value in the pixel data file to 1;

(b) means for executing the non-alpha-channel-aware application on the pixel data file;

(c) means for changing the alpha value of each pixel data value by changing the alpha value of the pixel data values in the pixel data file to 0 for each pixel data value in the pixel data file with an alpha value of 1, and changing the alpha value of the pixel data value in the pixel data file to the alpha value for full opacity for each pixel data value with an alpha value of 0; and (d) means for displaying the pixel data file in the alpha-channel-aware environment.

14. The computer graphics system of claim 13 where said means for changing the alpha value of the pixel data value comprises means for decrementing the alpha value of the pixel data value for each pixel data in the pixel data file by 1, modulo $2^n$.

15. The method of claim 13 where n is selected from a group consisting of 1 and 8.

16. A computer graphics system comprising computer executable modules for using a non-alpha-channel-aware application in a alpha-channel-aware environment, where (i) the non-alpha-channel-aware application writes pixel data values to an existing pixel data file of pixel data values; (ii) each pixel data value includes an n-bit alpha value and corresponds to a pixel location; (iii) the non-alpha-channel-aware application sets the alpha value of the pixel data value to m for each pixel for which a pixel data value is written by the application to the pixel data file; (iv) the alpha-channel-aware environment is a graphic environment in which each alpha value is used to set transparency of the corresponding pixel when the image in the pixel data file is displayed in the foreground of other image data, with an alpha value of zero corresponding to a full transparency and increasing alpha values corresponding to increasing levels of opacity; and (v) the alpha value for a desired opacity for pixels written by the non-alpha-channel-aware application is p, said computer executable modules comprising:

(a) means for initializing the alpha value of the pixel data value for all pixel data value in the pixel data file to $2^n-p+m$;

(b) means for executing the non-alpha-channel-aware application on the pixel data file;

(c) means for changing the alpha value of each pixel data value by changing the alpha value of the pixel data value in the pixel data file to m for each pixel data value in the pixel data file with an alpha value of $2^n-p+m$ and changing the alpha value of the pixel data value in the pixel data file to p for each pixel data value with an alpha value of m; and (d) means for displaying the pixel data file in the alpha-channel-aware environment.

17. The computer graphics system of claim 16, where said means for of changing the alpha value of the pixel data comprises means for incrementing the alpha value of the pixel data for all pixel data in the pixel data file by p−m, modulo $2^n$.

18. The computer graphics system of claim 16, where said means for of changing the alpha value of the pixel data comprises means for incrementing the alpha value of the pixel data for all pixel data in the pixel data file by m−p, modulo $2^n$.

19. The computer graphics system of claim 16, where at least one of p or m is zero.

\* \* \* \* \*